United States Patent
LeGrange et al.

[11] Patent Number: 5,966,480
[45] Date of Patent: Oct. 12, 1999

[54] ARTICLE COMPRISING AN IMPROVED CASCADED OPTICAL FIBER RAMAN DEVICE

[75] Inventors: Jane Deborah LeGrange, Princeton; William Alfred Reed, Summit; Kenneth Lee Walker, New Providence, all of N.J.

[73] Assignee: Lucent Technologies Inc., Murray Hill, N.J.

[21] Appl. No.: 09/027,630

[22] Filed: Feb. 23, 1998

[51] Int. Cl.[6] ........................................... G02B 6/26
[52] U.S. Cl. .................. 385/27; 385/37; 385/31; 385/24; 372/3; 372/6; 372/99; 359/334; 359/341
[58] Field of Search .................. 385/27, 37, 31, 385/24, 23, 43; 372/6, 3, 70, 72, 92, 99, 102; 359/333, 334, 341, 346

[56] References Cited

U.S. PATENT DOCUMENTS

| | | | |
|---|---|---|---|
| 5,323,404 | 6/1994 | Grubb | 372/6 |
| 5,623,508 | 4/1997 | Grubb et al. | 372/3 |
| 5,815,518 | 9/1998 | Reed et al. | 385/37 X |
| 5,864,644 | 1/1999 | DiGiovanni et al. | 385/43 |

OTHER PUBLICATIONS

"Optical Fiber Telecommunications", S. E. Miller et al., editors, Academic Press, New York, 1979, p. 127.
D. J. DiGiovanni 39–6 patent application, Serial No. 08/897,195, filed Jul. 21, 1997.
W. A. Reed 8–5–13 patent application, Serial No. 08/871,023, filed Jun 6, 1997.

*Primary Examiner*—Phan T. H. Palmer
*Attorney, Agent, or Firm*—Eugen E. Pacher

[57] ABSTRACT

The performance of optical fiber Raman devices can be increased by substitution of a broadband reflector (typically a multilayer dielectric mirror) for some of the narrowband reflectors (typically fiber Bragg gratings) that are conventionally used to define the optical cavities of the device. The device exemplarily is a Raman laser or amplifier, and in preferred embodiments a broadband reflector reflects all the Stokes-shifted wavelengths, such that the cavities are defined by the single broadband reflector and by a multiplicity of appropriately selected narrowband reflectors. Optionally the broadband reflector also serves to reflect the pump radiation.

9 Claims, 3 Drawing Sheets

ARTICLE COMPRISING AN IMPROVED CASCADED OPTICAL FIBER RAMAN DEVICE

FIELD OF THE INVENTION

The invention pertains to cascaded optical fiber Raman devices, e.g., Raman lasers or amplifiers, and to articles containing such devices.

BACKGROUND

U.S. Pat. No. 5,323,404 (incorporated herein by reference) discloses cascaded optical fiber Raman lasers and amplifiers (collectively "devices"). The devices comprise one or more pairs of reflectors, spaced apart, with reflectors of each pair having the same center wavelength. The reflectors typically are in-line refractive index Bragg reflectors "written" in $SiO_2$-based optical fiber with Ge-containing core, each pair of reflectors providing an optical cavity in the fiber. Cavities that are neighbors in wavelength differ in wavelength by one Stokes shift, the longer wavelength lying within the Raman gain spectrum. See "Optical Fiber Communications", S. E. Miller et al., editors, Academic Press 1979, p. 127 for the Raman gain spectrum of silica. Radiation that is resonating in one of the optical cavities will be referred to as a "Stokes line". See also U.S. patent applications Ser. No. 08/897,195, filed Jul. 21, 1997 by DiGiovanni et al., and Ser. No. 08/871,023, filed Jun. 6, 1997 by W. A. Reed et al., both incorporated herein by reference.

The optical fiber Raman devices comprise means for coupling pump radiation of wavelength $\lambda_p$ into the optical fiber, and are adapted for emission of radiation of a wavelength longer than $\lambda_p$. For further detail on the prior art devices, see the '404 patent and the '195 patent application.

In many potentially important applications of cascaded optical fiber Raman devices, the number of reflector pairs exceeds two. For instance, a laser having 1.5 $\mu$m output and utilizing 1.1 $\mu$m pump radiation typically requires 5 reflector pairs. Not only is a device with so many reflectors difficult to manufacture since the members of each pair of reflectors have to have essentially the same center wavelength, but the unwanted attenuation due to the multiplicity of reflectors can be significant. For instance, a Stokes line can experience up to 0.5 dB loss as the radiation passes through the reflectors for the other wavelengths.

Cascaded Raman devices are potentially desirable for high power applications, e.g., lasers as pump sources for rare earth doped fiber amplifiers, or for free space communications, and amplifiers as amplifiers in optical communications systems. Thus, it would be highly desirable to have available devices having higher output power and/or lower threshold than prior art cascaded Raman devices. This application discloses such devices.

As is known to those skilled in the art, the Stokes shifts are determined by the Raman gain spectrum of the fiber material and by frequency-selective elements, e.g., fiber Bragg gratings, that determine the amount of wavelength shift.

SUMMARY OF THE INVENTION

The invention is embodied in an article (e.g., an optical communication system) that comprises an improved cascaded optical fiber Raman device, i.e., a cascaded optical fiber Raman laser or amplifier, selected to have Stokes lines $\lambda_1, \lambda_2, \ldots \lambda_n$, where n typically is greater than or equal to 2, and the wavelengths of the Stokes lines increase from $\lambda_1$ to $\lambda_n$.

Specifically, the article comprises the device, with the device comprising a length of optical fiber, exemplarily $SiO_2$-based single mode fiber with a Ge-doped core. The device further comprises means for introducing pump radiation of wavelength $\lambda_p$ into the length of optical fiber, and still further comprises reflectors selected to reflect radiation of each of wavelengths $\lambda_1, \lambda_2 \ldots \lambda_n$, where the wavelength difference between any two adjacent wavelengths is a Stokes shift. The Stokes shifts need not be the same for all cavities, but will frequently be at or near the peak in the Raman gain spectrum of about 400 $cm^{-1}$. Optionally the device also comprises a reflector selected to reflect pump radiation $\lambda_p$.

Significantly, the reflectors include a multiplicity of narrowband reflectors, each said narrowband reflector having a reflectivity curve with full width at half maximum (FWHM) less than 20 nm. The reflectors further include at least one broadband reflector having FWHM greater than the relevant Stokes shift. The reflectors are disposed to provide optical cavities for the wavelengths $\lambda_1, \lambda_2 \ldots \lambda_n$.

The narrowband reflectors typically are conventional in-line refractive index gratings, with FWHM frequently 3 nm or less, and the broadband reflector typically is a multilayer dielectric mirror, typically disposed on an end-face of the length of optical fiber. In preferred embodiments more than two optical cavities are defined by a single broadband reflector. Preferably all n optical cavities are defined by the broadband reflector, with n typically being 4 or more. In addition to defining some or all optical cavities, the broadband reflector optionally can also serve to reflect the pump radiation $\lambda_p$.

Surprisingly, we have found that the use of a broadband reflector to define some or all cavities does not lead to significant losses associated with emission and amplification at wavelengths not well matched to the narrowband reflectors that also define the cavities. For instance, we found that a single broadband reflector has significantly less loss than a set of several narrowband reflectors, when one of the Stokes lines was made to pass through all but one of the reflectors. This will typically result in higher conversion efficiency and lower lasing thresholds, and can facilitate the use of shorter fiber lengths. Furthermore, pump radiation no longer has to meet stringent requirements on matching a narrowband reflector. Manufacture of a single set of narrowband reflectors is relatively simple, because of the elimination of the need for matching with a second set of narrowband reflectors. Finally, devices according to the invention can have a cost advantage over the corresponding prior art devices, since typically a single broadband reflector can be provided at lower cost than a matched set of narrowband reflectors.

The figures are not to scale or in proportion.

DETAILED DESCRIPTION

Figure 1:
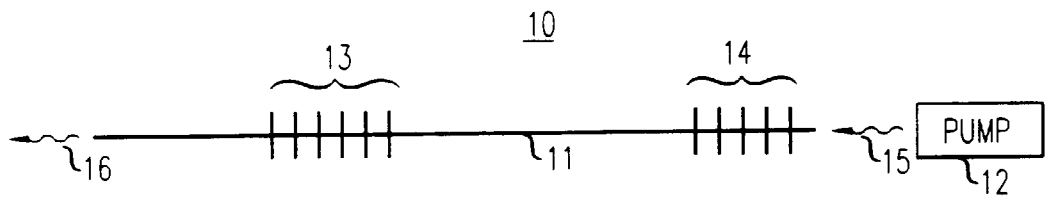
FIG. 1 schematically depicts a prior art cascaded Raman fiber laser.

FIG. 1 schematically shows a prior art cascaded optical fiber Raman laser 10. The laser comprises a length, (e.g., about 1 km) of optical fiber 11, and a source 12 of pump radiation 15, the pump radiation being coupled into the length of optical fiber by conventional means. Exemplarily the pump wavelength $\lambda_p$ is 1117 nm, and the source of the pump radiation 12 exemplarily is a cladding pumped fiber laser or a high power solid state laser. The Raman laser also comprises two sets (13, 14) of narrowband reflectors, typically in-line refractive index gratings. Set 13 exemplarily comprises 6 gratings, exemplarily of center wavelengths 1117, 1175, 1240, 1315, 1398 and 1480 nm. The 1117 nm grating is an optional pump reflector. All but the 1480 nm grating are high reflectivity (e.g., >95%), narrow bandwidth (FWHM≦3 nm) reflectors. The 1480 nm grating (referred to as the output coupler) has relatively low reflectivity (e.g., about 10–20%), with FWHM similar to that of the other gratings. Grating set 14 exemplarily comprises gratings with center wavelength 1175, 1240, 1315, 1395 and 1480 nm, but other center wavelengths could also be used. Pumping the length of optical fiber with 1117 nm radiation results, for the gratings as described, in emission from the fiber of 1480 nm radiation 16, which is available for utilization.

Figure 2:
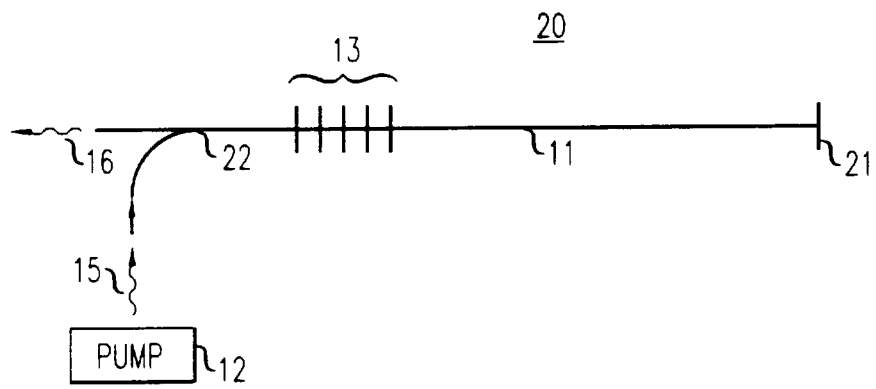
FIG. 2 schematically shows an exemplary cascaded Raman fiber laser according to the invention.

FIG. 2 schematically depicts an exemplary Raman device according to the invention, Raman laser 20, comprising a length of optical fiber 11, pump source 12, and a set of narrowband reflectors 13 (exemplarily having center wavelengths 1175, 1240, 1315, 1395 and 1480 nm). Pump radiation 15 (exemplarily 1117 nm) is coupled into the length of optical fiber by means of conventional coupler (frequently referred to as a "WDM") 22, and Stokes shifted radiation 16 at 1480 nm is available for utilization.

As shown in FIG. 2, a single broadband mirror 21 reflects all the wavelengths that are incident thereon, exemplarily 1117 nm pump radiation, and 1175, 1240, 1315, 1395 and 1480 nm Stokes shifted radiation. However, this is not a requirement, and lasers with hybrid reflectors are contemplated. For instance, the broadband mirror can be selected to reflect the pump radiation and one or more of the Stokes-shifted wavelengths (e.g., 1175 and 1240 nm), with the remaining Stokes-shifted wavelengths reflected by conventional narrowband reflectors.

By way of further example, the broadband reflector can be selected to reflect two or more of the Stokes-shifted wavelengths (e.g., 1315, 1395 and 1480 nm), with the remaining Stokes-shifted wavelengths and the pump wavelength being reflected by conventional narrowband reflectors. However, in a preferred embodiment the broadband reflector reflects all Stokes-shifted wavelengths, and optionally also reflects $\lambda_p$.

Figure 3:
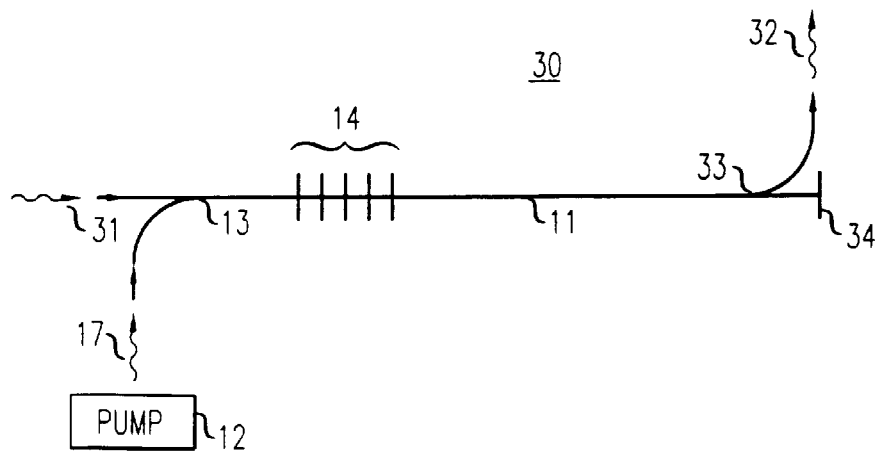
FIG. 3 schematically shows an exemplary cascaded Raman fiber amplifier according to the invention.

FIG. 3 schematically shows a further embodiment of the invention, namely, a cascaded optical fiber Raman amplifier 30. Signal radiation 31 (exemplarily 1550 nm) is coupled into the Raman amplifier fiber 11, travels through the fiber, and the amplified signal is coupled from the fiber by conventional WDM 33. Pump radiation 17 (exemplarily 1117 nm) is coupled into the Raman amplifier fiber by means of conventional WDM 13. The set (14) of narrowband reflectors (exemplarily 1175, 1240, 1315, 1395, 1480 nm) defines, together with broadband reflector 34, the optical cavities. Amplification of the signal takes place by stimulated Raman scattering.

Figure 4:
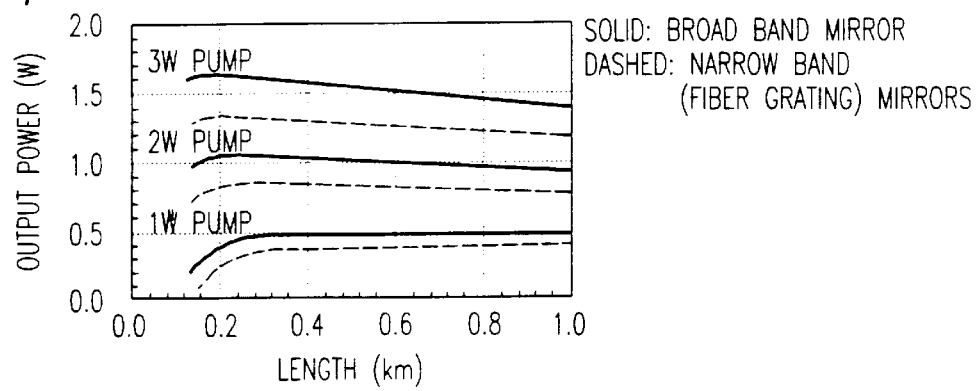
FIGS. 4–6 show exemplary computed data for lasers according to the invention and corresponding prior art lasers.
Figure 5:
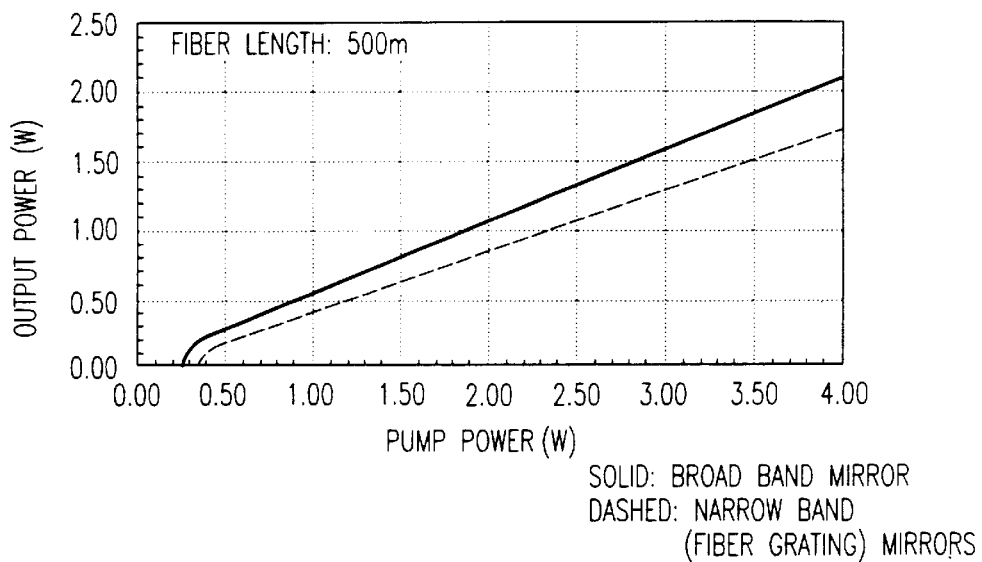

FIGS. 4–5 show computed data that demonstrate the significant improvements attainable through use of a broadband reflector. The fiber is assumed to be a $SiO_2$-based, high Δ, small core optical fiber, the broadband reflector is assumed to have >98% reflectivity for kp and all Raman-shifted wavelengths, (and typically <10% at the next Stokes line above $\lambda_n$) the narrowband reflectors are assumed to have >98% reflectivity at the respective center wavelengths, $\lambda_p$=1117 nm, and the output coupler is assumed to have 10% reflectivity at 1480 nm.

FIG. 4 shows the laser output power as a function of fiber length, for pump powers of 1, 2 and 3W, respectively. The figure clearly shows that, for a given fiber length and pump power, the laser with broadband reflector has considerably greater output power than the corresponding prior art laser with narrowband reflectors.

Figure 6:
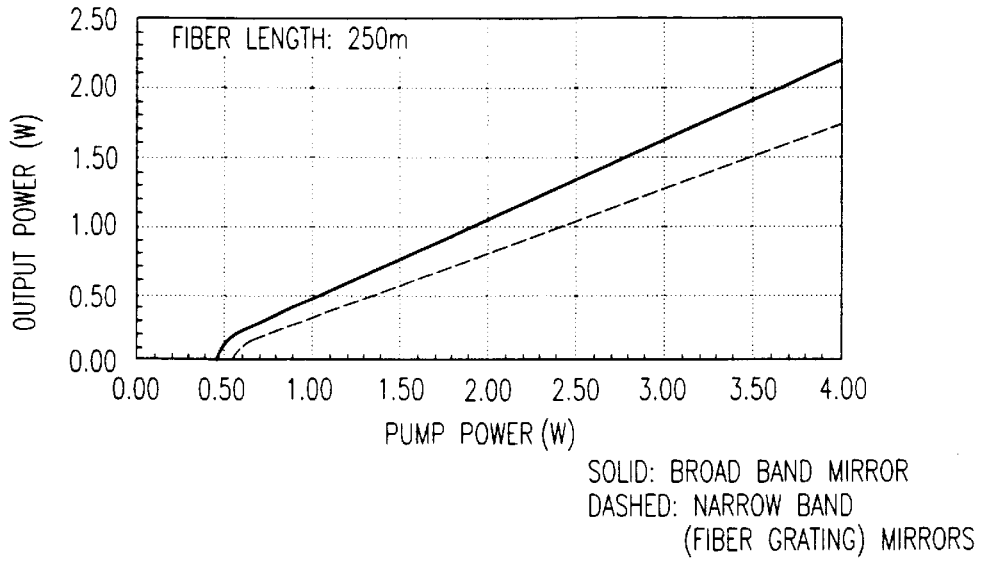

FIGS. 5 and 6 show the laser output power as a function of pump power, for 500 m and 250 m fiber length, respectively. The figures show that, for a given pump power, the laser with broadband reflector has significantly greater output power than the corresponding prior art laser with narrowband reflectors. The figures also show that the laser according to the invention has significantly lower threshold power than the corresponding prior art laser.

By way of example, at 2W pump power, the use of the broadband reflector results in output increase from 0.83W to 1.03W, and at 500 m fiber length it results in a decrease of the threshold from 0.358W to 0.288W.

Figure 7:
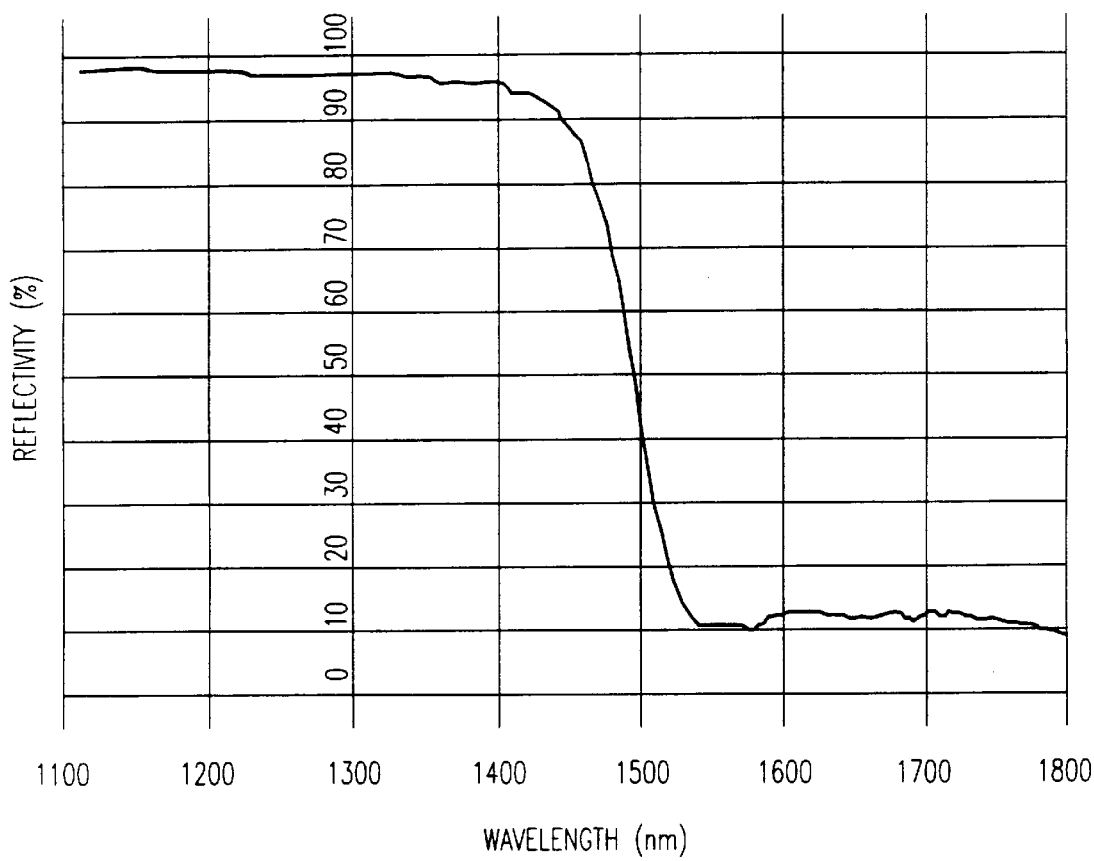
FIG. 7 shows the reflectivity curve of an exemplary broadband reflector.

FIG. 7 shows reflectivity vs. wavelength of an exemplary broadband reflector, a multilayer dielectric mirror. Such reflectors can be obtained commercially, for instance, from Evaporated Coatings, Inc., of Willow Grove, Pennsylvania, and can be fabricated to meet specific requirements, e.g, reflectivity >90% for $\lambda_p$ and $\lambda_1, \lambda_2 \ldots \lambda_n$, and <10% for the Stokes line immediately about $\lambda_n$. The latter condition is desirable to prevent lasing at the signal wavelength of a Raman amplifier.

Figure 8:
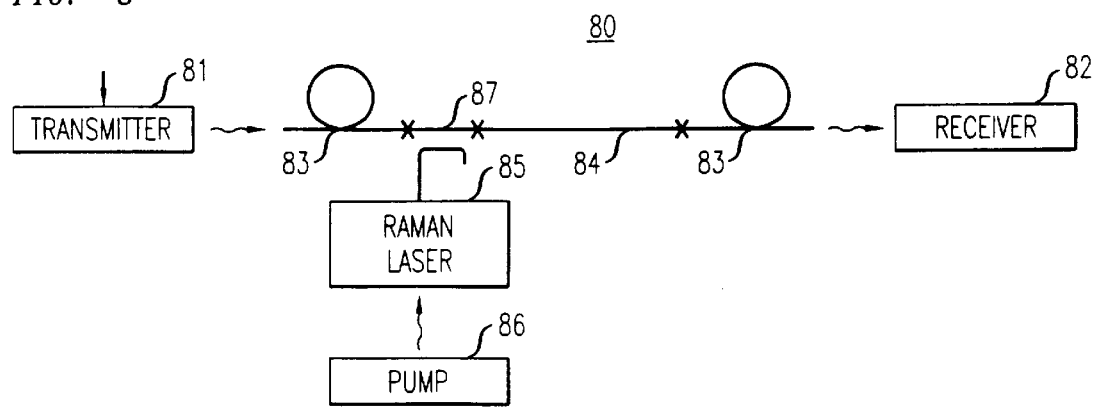
FIG. 8 schematically shows an exemplary optical fiber communication system according to the invention.

FIG. 8 schematically shows an exemplary communication system 80 according to the invention, wherein numerals 81 and 82 refer to the transmitter and receiver, respectively, and 83 refers to conventional transmission fiber. Numeral 84 refers to a conventional rare earth doped amplifier fiber, and numerals 85–87 refer to a cascaded Raman laser with broadband reflector, a source of pump radiation, and a WDM coupler for coupling the Raman laser output into the rare earth doped amplifier fiber, respectively. The "x" symbols refer to fiber splices.

The invention claimed is:

1. Apparatus comprising a cascaded optical fiber Raman device that comprises a) a length of optical fiber;

b) a coupler for introducing pump radiation of wavelength $\lambda_p$ into said length of optical fiber; and c) reflectors selected to reflect radiation of each of wavelengths $\lambda_1, \lambda_2 \ldots \lambda_n$, where the wavelength difference between any two adjacent wavelengths corresponds to a Stokes shift, and n≧2

CHARACTERIZED IN THAT d) said reflectors include a multiplicity of narrowband reflectors, each said narrowband reflector having a reflectivity curve with full width at half maximum (FWHM) less than 20 nm; and e) said reflectors further include a broadband reflector with FWHM greater than said Stokes shift, said narrowband and broadband reflectors disposed to provide optical cavities for the wavelengths $\lambda_1, \lambda_2 \ldots \lambda_n$.

2. Apparatus according to claim 1, wherein the broadband reflector is selected to reflect a pump radiation of wavelength $\lambda_p$, and to also reflect at least one of the wavelengths $\lambda_1, \lambda_2 \ldots \lambda_n$.

3. Apparatus according to claim 2, wherein the broadband reflector has reflectivity >90% at each of said wavelengths.

4. Apparatus according to claim 2, wherein the broadband reflector is selected to reflect radiation of each of the wavelengths $\lambda_p, \lambda_1, \lambda_2 \ldots \lambda_n$.

5. Apparatus according to claim 1, wherein n>2, and each one of said optical cavities is defined by a narrowband reflector of FWHM less than 20 nm, and by said broadband reflector.

6. Apparatus according to claim 1, wherein said broadband reflector is a multilayer dielectric mirror disposed on an optical fiber endface.

7. Apparatus according to claim 1, wherein said device is a Raman fiber laser adapted for generating output radiation of wavelength $\lambda_n$ by Stokes shifting pump radiation of wavelength $\lambda_p$.

8. Apparatus according to claim 1, wherein said device is a Raman fiber amplifier adapted for amplifying input radiation of wavelength $\lambda_s > \lambda_n$ by stimulated Raman scattering.

9. Apparatus according to claim 1, wherein the apparatus is an optical fiber communication system comprising a transmitter of signal radiation of wavelength $\lambda_s$, a receiver of said signal radiation, and an optical fiber transmission path signal-transmissively connecting the transmitter and the receiver, with an optical fiber amplifier disposed in the fiber transmission path, said amplifier receiving pump radiation from said cascaded optical fiber Raman device.

* * * * *